US008776073B1

(12) United States Patent
Morlen

(10) Patent No.: US 8,776,073 B1
(45) Date of Patent: *Jul. 8, 2014

(54) TASK PRIORITIZATION BASED ON USERS' INTEREST

(71) Applicant: United Services Automobile Association (USAA), San Antonio, TX (US)

(72) Inventor: Randy R. Morlen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,253

(22) Filed: May 21, 2013

Related U.S. Application Data

(63) Continuation of application No. 12/100,704, filed on Apr. 10, 2008, now Pat. No. 8,448,177.

(51) Int. Cl.
G06F 17/30 (2006.01)

(52) U.S. Cl.
USPC .......................................... 718/103

(58) Field of Classification Search
None
See application file for complete search history.

(56) References Cited

U.S. PATENT DOCUMENTS

| 4,658,351 | A  | * | 4/1987  | Teng ............................ 718/103 |
| 6,408,277 | B1 |   | 6/2002  | Nelken |
| 6,411,947 | B1 |   | 6/2002  | Rice et al. |
| 6,684,191 | B1 | * | 1/2004  | Murphy et al. .............. 705/7.22 |
| 6,961,720 | B1 |   | 11/2005 | Nelken |
| 7,266,535 | B1 |   | 9/2007  | Nelken et al. |
| 7,330,822 | B1 |   | 2/2008  | Robson et al. |
| 7,334,229 | B1 | * | 2/2008  | McDonald et al. ........... 718/104 |
| 7,924,871 | B2 | * | 4/2011  | Hyslop ......................... 370/462 |
| 8,102,373 | B2 | * | 1/2012  | Kwon ........................ 345/169 |
| 8,155,988 | B2 | * | 4/2012  | Kunichika et al. .......... 705/7.11 |
| 8,448,177 | B1 |   | 5/2013  | Morlen |
| 2003/0151590 | A1 | * | 8/2003 | Pollard ........................ 345/156 |
| 2004/0133593 | A1 |   | 7/2004  | Pathak et al. |
| 2004/0225650 | A1 |   | 11/2004 | Cooper et al. |
| 2005/0108348 | A1 |   | 5/2005  | Lee |
| 2005/0271048 | A1 |   | 12/2005 | Casey |
| 2006/0230117 | A1 |   | 10/2006 | Gross et al. |
| 2007/0058559 | A1 |   | 3/2007  | Xu |
| 2007/0143290 | A1 |   | 6/2007  | Fujimoto et al. |

OTHER PUBLICATIONS

Tantam, D. "The machine as psychotherapist: impersonal communication with a machine", Advances in Psychiatric Treatment, http://apt.rcpsych.org/cgi/content/full/12/6/416, downloaded 2008, 15 pgs.

* cited by examiner

Primary Examiner — Eric Coleman
(74) Attorney, Agent, or Firm — Kane Kessler, P.C.; Barry E. Negrin

(57) ABSTRACT

Systems, methods and computer readable media are disclosed for prioritizing tasks associated with a group of users based on number of times the users have monitored the status of a task. In addition to the general system, systems, methods and computer readable media for task prioritizing, the tasks may be prioritized based on the number of users associated with a task, the importance of each user associated with a task, and the way the task was identified.

20 Claims, 2 Drawing Sheets

TASK PRIORITIZATION BASED ON USERS' INTEREST

CROSS-REFERENCE TO RELATED APPLICATIONS

This application is a Continuation of U.S. patent application Ser. No. 12/100,704 filed on Apr. 10, 2008, now U.S. Pat. No. 8,448,177, which is herein incorporated by reference.

BACKGROUND OF THE INVENTION

Many companies have difficulty in processing the large number of outstanding issues they have to deal with. This is a problem because failure to properly respond to an issue (both in terms of substance and time) often upsets a customer or user, especially if that user has identified the issue to the company.

Not all issues are equally important, so any attempt to deal with a large number of issues with limited resources requires efficient ways of prioritizing issues. To that end, there are ways of evaluating a user's interest in a given issue, and these metrics may be used to more accurately prioritize the issue.

The current art makes attempts to prioritize a task according to object factors (such as the cost of money or time that completing a task will require, or the loss of money or time from leaving the task uncompleted), but ignores that there are subjective factors which may be used to prioritize a task, particularly subjective factors which are inadvertently conveyed. These subjective factors are a valuable tool in prioritizing tasks. Where a user subjectively believes a task to be very important, even if it is objectively unimportant, failure to appropriately complete the task may anger the user. Where that user is the customer and the entity charged with the task is a business, an angered customer may end his business relations with that business.

For example, take the case of a customer of an internet service provider (ISP) company who obtains from the ISP interne service at his residence. If the service is interrupted because of an equipment failure, the task of restoring service may objectively appear to have a priority equal to that of any other customer in the same situation. However, if the customer has limited mobility, and the internet is his primary means of communicating with the outside world, the interrupted service may be of subjectively significant importance to him. This subjective importance may manifest itself by the customer repeatedly checking with the company for updates to the status of the task of restoring service, and by the customer's inquiries being particularly detailed. If the company is unable to accurately quantify this subjective importance, and respond to the task accordingly, the customer may become upset and terminate his service with the company in favor of a rival ISP, and the company will lose business.

A benefit of subjective prioritization is that one may address tasks before the user or customer becomes overly disappointed or angry. Thus, subjective prioritization can result in an unexpectedly large improvement in customer satisfaction.

SUMMARY OF THE INVENTION

In example embodiments of the present disclosure, a method and system are provided to prioritize tasks associated with a group of users based on the users' interest in each task. Where a task is identified and associated with a user, an initial priority may be assigned to the task. Additionally, the user may be given information on how he or she may access status information about the task. When the user then accesses status information about the task, he or she manifests interest in that task, which may be correlated to a relative importance the tasks has in the eyes of the user. Thus, when the user accesses status information about the task, the priority of the task may be increased. Other factors that may correlate to importance include a relative importance of a user, and the way in which the task was identified.

The method may include, but does not require, first identifying a first task associated with a first user. Then a first priority level is assigned to the first task, and a message is sent to the first user that comprises information on how said first user may access status information about the first task. When the user accesses the status of the first task, the priority level of the task modified.

A system and computer readable medium are also disclosed that perform comparable functions as the method discussed above.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for prioritizing tasks associated with a group of users based on the users' interest in each task in accordance with this specification are further described with reference to the accompanying drawings in which.

DETAILED DESCRIPTION OF ILLUSTRATIVE EMBODIMENTS

Figure 1:
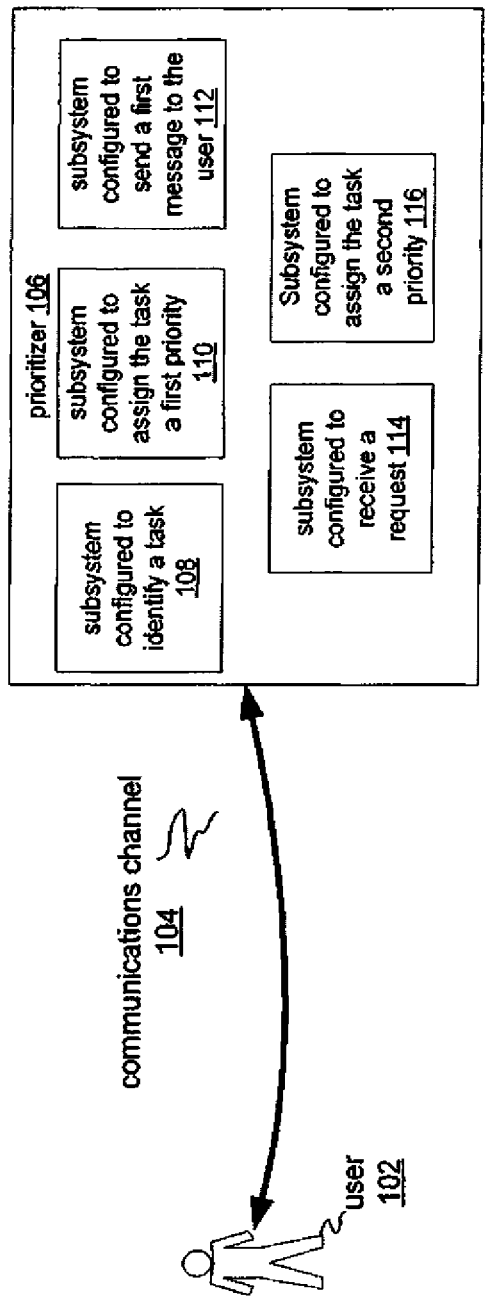
FIG. 1 illustrates an example system for prioritizing tasks associated with a group of users based on the users' interest in each task.
Figure 2:
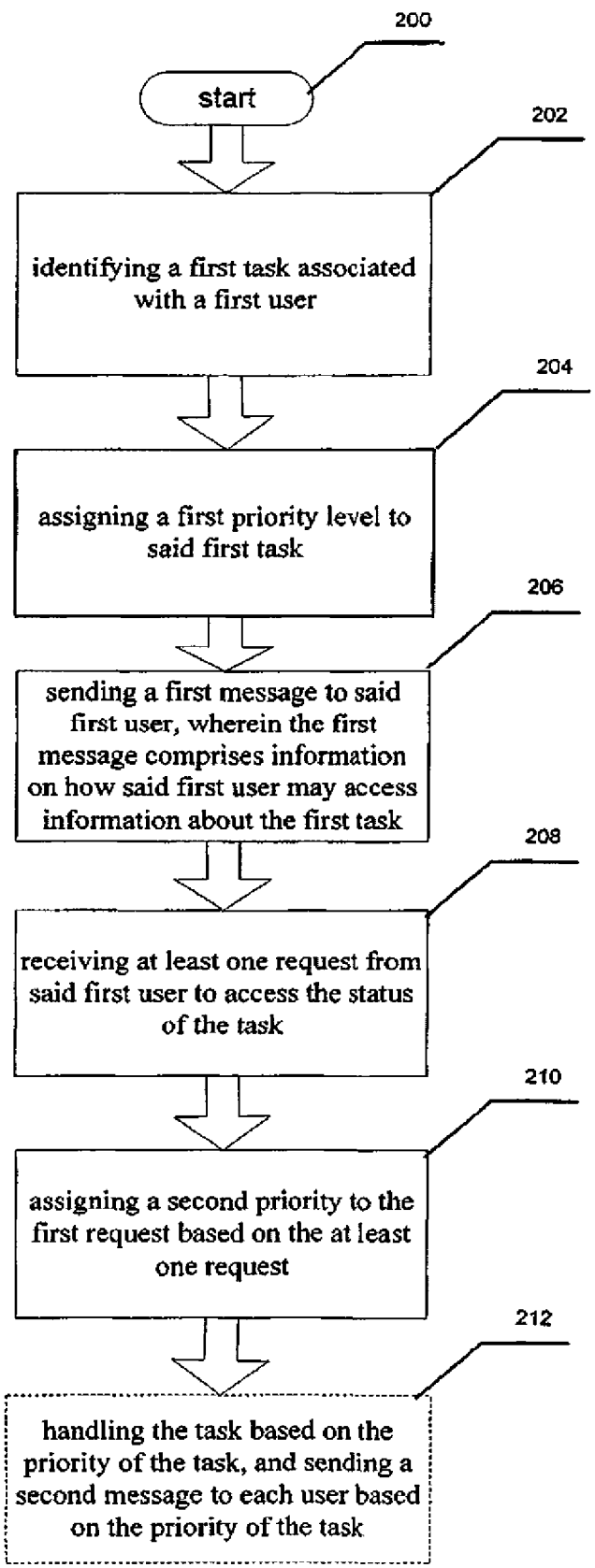
FIG. 2 illustrates an example computer-based operational procedure for prioritizing tasks associated with a group of users based on the users' interest in each task.

Certain specific details are set forth in the following description and figures to provide a thorough understanding of various embodiments. Those of ordinary skill in the relevant art will understand that they can practice other embodiments without one or more of the details described below. While various methods are described with reference to steps and sequences in the following disclosure, the description as such is for providing a clear implementation of embodiments of the invention, and the steps and sequences of steps should not be taken as required. FIG. 1 illustrates an operating environment in which operating procedures may be performed. FIG. 2 depicts example operating procedures.

In addition, while various methods are described with reference to steps and sequences in the following description, the description is intended to describe a clear implementation of embodiments of the invention, and the steps and sequences of steps should not be taken as required to practice this invention. In general, it is contemplated that the various systems, methods, and computer readable media disclosed herein will be implemented within a system for processing credit or charge card transactions. Such a system will generally be described as a "computer-implemented" system that includes "subsystems" for automatically handling card transactions in the manner described below. It should be understood that the various subsystems may be implemented with computer software that is executable by a processor, as described.

FIG. 1 illustrates a computer-based system for prioritizing tasks associated with a group of users based on the users' interest in each task.

A prioritizer 106 is a computer-based system comprising at least one subsystem configured to identify a first task associated with a first user 108, at least one subsystem configured to assign a first priority level to said first task 110, at least one subsystem configured to send a first message to said first user, wherein the first message comprises information on how said first user may access status information about the first task 112, at least one subsystem configured to receive at least one request from said first user to access the status of the first task 114, and at least one subsystem configured to assign a second priority level to the first task based on the at least one request 116. In an embodiment, these subsystems may comprise separate computing systems that communicate with each other across a network. In another embodiment, these subsystems are all implemented on a single, unified computing device.

A subsystem configured to identify a first task associated with a first user 108 first identifies the first task and associates it with the first user 102. In an embodiment, the first task is associated with the first user 102 because the first user 102 brought the task to the attention of the prioritizer 106. This may comprise a wide variety of techniques for inputting data into the prioritizer 106. For example, where the user 102 considers a company to be performing poorly, he or she may write a letter, e-mail, or phone the company to express this. An image of the letter may be obtained by the prioritizer 106 from a scanner, and that imagine may be processed by an optical character recognition device to obtain the text of the letter in a computer-readable format. The e-mail may enter the prioritizer 106 directly, and be parsed to identify the text of the task from the e-mail metadata. A phone call may be recorded and parsed by voice recognition software and converted into computer text.

In another embodiment, the first user 102 does not bring the task to the attention of the prioritizer 106. For example, a technician for an electric utility company may, while on routine inspection of equipment, may note that the wires leading to the first user's house are in disrepair and need to be replaced. That technician may then identify the task and associate it with the first user without the first user's input.

Once the first task has been identified and associated with a first user, a subsystem configured to assign a first priority level to said first task 110 assigns a priority level to the task. In an embodiment, the prioritizer 106 assigns a neutral priority level for the first priority level of every task that enters the system 106—such that the first priority level is the same for all tasks upon first being identified. In another embodiment, the first priority level may not be the same for all tasks upon first being identified and may be determined by ways in which the task was identified.

Then, a subsystem configured to send a first message to said first user 112 sends the first message to the first user. The first message may comprise information on how said first user may access status information about the first task. In an embodiment, the first message may comprise a case number, a link to view a web page, a phone number to call, a person to contact, and a credential. For example, where the user identifies the first task by sending an e-mail to the prioritizer 106, the prioritizer 106 may e-mail the user the first message with a link to a web page that displays the status of the task. Where the user identifies the first task by telephone, the first message may comprise a computer generated audio message during the phone call telling the user the case number for the task. Where the task is deemed sufficiently important that a person should communicate the first message to the first user, the prioritizer 106 may prompt a person (such as an employee of a company implementing the computer system) to do so. In the example where a technician for an electrical utility company identifies a task without the first user's input, as discussed above, the first message may also comprise a summary of the task so that the first user is able to understand the nature of the task. This summary may be entered into the prioritizer 106 by a person, such as the technician, or generated by the prioritizer 106 based on the requirements of the first task.

When the first user then requests to access the status of the first task, this request is received by a subsystem configured to receive at least one request from said first user to access the status of the first task 114. When the user wants to access the status information about the first task, he or she takes the information on how to access the status information and then uses it to do so as described above. In the example the prioritizer 106 e-mails the user the first message with a link to a web page that displays the status of the task (in an embodiment, the prioritizer 106 comprises this web server), the user then requests access to the status of the first task by clicking on that link. In the example the user identifies the first task by telephone and receives a case number, the user may request access to the status of the first task by calling the same phone number and entering (by voice or keypad entry) the case number. An automated phone routing system may interface with the prioritizer 106 to deliver the request to prioritizer 106 and then receive the result from the prioritizer 106 and convert that result into audio to deliver to the user.

Additionally, the medium of requesting to access the status of the first task may be different from the medium by which the user received the information on how to access status information about the first task. For instance, if the user receives a case number via telephone, he may then request to access the status of the task by going to a web site and entering the case number in a text entry box to retrieve a web page that contains that information.

When the prioritizer 106 receives from the first user a request to access the status of the first message, a second priority level is assigned to the first task by a subsystem configured to assign a second priority level to the first task based on the at least one request 116. In an embodiment, a request by the user to access the status of the first task is indicative of that user viewing the task as important. In this case, where there is such a request, the second priority level will be greater than the first priority level, so assigning the second priority level to the task will increase the priority level of the task. A prioritizer 106 receiving a plurality of such requests regarding one task may calculate the second priority level to be correspondingly higher. A variety of computer-based algorithms may be implemented to calculate this. In one embodiment, each request increases the priority by a set level. In other embodiments, a successive request increases the priority level by greater and greater amounts (indicative of great interest in the task), or by diminishing amounts (where it is determined that the first request is more important in determining a priority than a successive request).

In an embodiment, this further comprises identifying an importance level assigned to the first user, and wherein assigning the priority is based on each request and the first user's importance level. Take the case of a company's internal task system. In an embodiment, the chief executive officer of the company is a very important person within the company and has a correspondingly high importance level in the task prioritizing system. By contrast, the entry-level worker at the company would have a much lower importance level in the system, with a department manager having an importance level in between those two. Where the chief executive officer corresponds to a task and requests to access the status of the task, the task may be assigned a very high priority. Where the entry-level worker corresponds to a different task and requests to access the status of that task, that task may be assigned a lower priority. In an embodiment, if the entry-level worker were to request the status of his task many times, the status of that task may be assigned a higher priority level than the task that the chief executive officer only once requested to access the status level of. In an embodiment where a bank has an importance level for each customer, those customers with large account balances, who participate in services that are very profitable for the bank, or who have had accounts with the bank for a long period of time may have a greater importance than those customers who have small account balances, are not particularly profitable to the bank or who are recent customers. In an embodiment, an airline may have an importance level for each customer based on that customer's frequent flier miles or profitability to the airline.

In an embodiment, this further comprises assigning the priority based on the number of users that correspond to the task. In an embodiment, a task may be given a higher priority when many users correspond to it than when few users correspond to it. This may be because having many users corresponds to a task means that handling the task properly is of importance to many people, whereas where only one user corresponds to a task it affects only one person. The embodiment where each user has a corresponding importance may be combined with this embodiment such that the priority level assigned to a task reflects the weighted importance of each user who corresponds to that task.

In an embodiment, the second priority level may be assigned relative to the first priority level. For instance, it may be determined that the second priority level should be one unit higher than the first priority level, and in that case, the second priority level would be assigned to the task as such.

FIG. 2 illustrates a method for prioritizing tasks associated with a group of users based on the users' interest in each task. Those skilled in the art will note that operations 200-210 are illustrative in purpose and that different implementations can select appropriate operation(s) for such implementations.

Operation 200 begins the operational process. Operation 200 can be triggered for example in response to initializing a computer-based system that tracks the status of tasks.

Operation 202 depicts identifying a first task associated with a first user. In an embodiment, this may comprise being alerted to the first task by the first user. This may comprise a wide variety of techniques for inputting data into a computer system. For example, where the user considers a company to be performing poorly, he or she may write a letter, e-mail, or phone the company to express this. An image of the letter may be obtained from a scanner, and that imagine may be processed by an optical character recognition device to obtain the text of the letter in a computer-readable format. The e-mail may enter the computer system directly, and be parsed to identify the text of the task from the e-mail metadata. A phone call may be recorded and parsed by voice recognition software and converted into computer text.

In an embodiment, the company may identify the first task as it corresponds to the first user without that first user's input. For example, a technician for an electric utility company may, while on routine inspection of equipment, may note that the wires leading to the first user's house are in disrepair and need to be replaced. That technician may then identify the task and associate it with the first user in the computer system without the first user's input.

Operation 204 depicts assigning a first priority level to said first task. In an embodiment, a computer system assigns a neutral priority level for the first priority level of every task that enters the system—such that the first priority level is the same for all tasks upon first being identified. In another embodiment, the first priority level may not be the same for all tasks upon first being identified and may be determined by ways in which the task was identified.

In an embodiment, this further comprises assigning the priority based on the number of users that correspond to the task. In an embodiment, a task may be given a higher priority when many users correspond to it than when few users correspond to it. This may be because having many users corresponds to a task means that handling the task properly is of importance to many people, whereas where only one user corresponds to a task it affects only one person. The embodiment where each user has a corresponding importance may be combined with this embodiment such that the priority level assigned to a task reflects the weighted importance of each user who corresponds to that task.

In alternative embodiment, operation 204 further comprises, prior to identifying a first task, receiving a communication relating to said first task and categorizing the type of communication, wherein the first priority level is assigned based on the type of communication. For example, the type of communication may comprise the user filling out an online form upon being prompted to do so, sending an e-mail, making a telephone call, or writing and sending a physical letter. Not all of these forms of communication require the same amount of effort. It generally requires relatively little effort to send a short e-mail, so it may be that the user who does so finds the task of only minimal importance, as manifested by the relatively small amount of effort put into communicating the task, and a low priority level may be assigned to the task. However, it may require a significant amount of effort to write and send a lengthy hand-written letter, so it may be that the user who does this finds the task to be very important, and a higher priority level may be assigned to the task.

In alternative embodiment, operation 204 further comprises, prior to identifying a first task, receiving a communication relating to said first task and categorizing the contents of the communication, wherein the first priority level is assigned based on the contents of the communication. For example, where the contents of the user's communication include words like "displeased" and "unsatisfied," it may be that the user views the task as relatively minor and it may be assigned a low priority level. However, where the contents of the user's communication include words like "significant" and "angry," it may be that the user views the task as of grave importance and the task may be assigned a high priority level.

Operation 206 depicts sending a first message to said first user, wherein the first message comprises information on how said first user may access status information about the first task. In an embodiment, the first message may comprise a case number, a link to view a web page, a phone number to call, a person to contact, and a credential. For example, where the user identifies the first task by sending an e-mail to the computer system that implements this method, that computer system may e-mail the user the first message with a link to a web page that displays the status of the task. Where the user identifies the first task by telephone, the first message may comprise a computer generated audio message during the phone call telling the user the case number for the task. Where the task is deemed sufficiently important that a person should communicate the first message to the first user, the computer system may prompt a person (such as an employee of a company implementing the computer system) to do so. In the example where a technician for an electrical utility company identifies a task without the first user's input, as discussed above, the first message may also comprise a summary of the task so that the first user is able to understand the nature of the task. This summary may be entered into the system by a person, such as the technician, or generated by the computer system based on the requirements of the first task.

Operation 208 depicts receiving at least one request from said first user to access the status of the first task. When the user wants to access the status information about the first task, he or she takes the information on how to access the status information and then uses it to do so as described above. In the example where a computer system that implements this method e-mails the user the first message with a link to a web page that displays the status of the task, the user then requests access to the status of the first task by clicking on that link. In the example the user identifies the first task by telephone and receives a case number, the user may request access to the status of the first task by calling the same phone number and entering (by voice or keypad entry) the case number. An automated phone routing system may interface with the prioritizing computer system to deliver the request to the prioritizing computer system and then receive the result from the prioritizing computer system and convert that result into audio to deliver to the user.

Additionally, the medium of requesting to access the status of the first task may be different from the medium by which the user received the information on how to access status information about the first task. For instance, if the user receives a case number via telephone, he may then request to access the status of the task by going to a web site and entering the case number in a text entry box to retrieve a web page that contains that information.

Operation 210 depicts assigning a second priority level to the first task based on the at least one request. In an embodiment, a request by the user to access the status of the first task is indicative of that user viewing the task as important. In this case, where there is such a request, the second priority level will be greater than the first priority level, so assigning the second priority level to the task will increase the priority level of the task. A computer system receiving a plurality of such requests regarding one task may calculate the second priority level to be correspondingly higher. A variety of computer-based algorithms may be implemented to calculate this. In one embodiment, each request increases the priority by a set level. In other embodiments, a successive request increases the priority level by greater and greater amounts (indicative of great interest in the task), or by diminishing amounts (where it is determined that the first request is more important in determining a priority than a successive request).

In an embodiment, this further comprises identifying an importance level assigned to the first user, and wherein assigning the priority is based on each request and the first user's importance level. Take the case of a company's internal task system. In an embodiment, the chief executive officer of the company is a very important person within the company and has a correspondingly high importance level in the task prioritizing system. By contrast, the entry-level worker at the company would have a much lower importance level in the system, with a department manager having an importance level in between those two. Where the chief executive officer corresponds to a task and requests to access the status of the task, the task may be assigned a very high priority. Where the entry-level worker corresponds to a different task and requests to access the status of that task, that task may be assigned a lower priority. In an embodiment, if the entry-level worker were to request the status of his task many times, the status of that task may be assigned a higher priority level than the task that the chief executive officer only once requested to access the status level of.

In an embodiment, this further comprises assigning the priority based on the number of users that correspond to the task. In an embodiment, a task may be given a higher priority when many users correspond to it than when few users correspond to it. This may be because having many users corresponds to a task means that handling the task properly is of importance to many people, whereas where only one user corresponds to a task it affects only one person. The embodiment where each user has a corresponding importance may be combined with this embodiment such that the priority level assigned to a task reflects the weighted importance of each user who corresponds to that task.

In an embodiment, the second priority level may be assigned relative to the first priority level. For instance, it may be determined that the second priority level should be one unit higher than the first priority level, and in that case, the second priority level would be assigned to the task as such.

Operation 212 depicts the optional operations of handling the task based on the priority of the task, and sending a second message to each user based on the priority of the task. In an embodiment, handling the task based on the priority of the task may comprise treating the task as being more significant when it has a relatively high priority level. A variety of computer-based algorithms may be implemented to achieve this. For example, where the task has a low priority level, and there is a queue of tasks, it may be appropriate for a computer system to move the task to the rear of the queue because it is of little importance to only one or a few users. Where the task has a high priority level, it may be that the task should be dealt with as soon as possible and with little regard to the resources required to do so, because it is of great importance to a great number of users.

In an embodiment, sending a second message to each user based on the priority of the task may comprise a computer system doing one of sending the user a form e-mail, directing a person to send the user a physical letter, calling the user, calling the user as soon as possible, and having a very important person call the user. Where the task has a low priority level, it may be that a form e-mail is a suitable response to the task because it is of little importance to the user. However, where the task has a high priority level, the appropriate response may be to call each user corresponding to the task personally because the task is of great importance.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed is:

1. A non-transitory computer-readable medium storing instructions executable by a processing resource to:
assign a first priority level to a task associated with a user;
send a first message to the user, wherein the message comprises a summary of the task and information on how the user may access status information about the task;
receive a request from the user to access the status information of the task; and
assign a second priority level to the task based on the request.

2. The non-transitory computer-readable medium of claim 1, further comprising instructions executable to create a prompt to send the first message to the user.

3. The non-transitory computer-readable medium of claim 1, wherein the second priority level is greater than the first priority level.

4. The non-transitory computer-readable medium of claim 1, further comprising instructions executable to identify an importance level assigned to the user.

5. The non-transitory computer-readable medium of claim 1, further comprising instructions executable to handle the task based on the second priority level of the task.

6. The non-transitory computer-readable medium of claim 1, further comprising instructions executable to send a second message to the user based on the second priority level of the task.

7. The non-transitory computer-readable medium of claim 1, further comprising instructions executable to assign the second priority level relative to the first priority level.

8. A non-transitory computer-readable medium storing instructions executable by a processing resource to:
assign a first priority level to a task associated with a user based on an importance level of the user;
receive a prompt to send a message associated with the task to the user;
in response to receiving the prompt, send a message to the user, wherein the message comprises a summary of the task and information on how the user may access status information about the task;
receive a request from the user to access the status information of the task; and
assign a second priority level to the task based on the request.

9. The non-transitory computer-readable medium of claim 8, further comprising instructions executable to assign the second priority level based on the number of users that correspond to the task.

10. The non-transitory computer-readable medium of claim 8, further comprising instructions executable to assign the second priority level based on a weighted importance level comprising a combination of the number of users that correspond to the task and an importance level of each of the number of users that correspond to the task.

11. The non-transitory computer-readable medium of claim 8, further comprising instructions executable to determine a communication type of the message based on the first priority level.

12. The non-transitory computer-readable medium of claim 8, further comprising instructions executable to generate the summary of the task based on a requirement of the task.

13. The non-transitory computer-readable medium of claim 8, further comprising instructions executable to queue the task with a number of different tasks in order of priority level.

14. A method for task prioritization, comprising:
receiving, via a prioritizer, a communication relating to a task associated with a first user;
categorizing the communication by type of communication;
assigning, by the prioritizer, a first priority level to the task based on the categorization by type of communication;
creating a prompt to send a message associated with the task to the first user;
sending, the message to the first user, wherein the message comprises information including how the first user may access status information about the task;
receiving a first request from the first user to access the status information of the task;
assigning a second priority level greater than the first priority level to the task based on the first request;
receiving a second request from the first user to access the status information of the task; and
assigning a third priority level greater than the second priority level to the task based on the second request.

15. The method of claim 14, further comprising:
categorizing the communication by content of the communication; and
assigning, by the prioritizer, the first priority level to the task based on the categorization by type of communication and the categorization by content of the communication.

16. The method of claim 14, wherein the second priority level is greater than the first priority level by a same amount as the third priority level is greater than the second priority level.

17. The method of claim 14, wherein receiving the communication relating to the task comprises receiving the communication from the first user.

18. The method of claim 17, further comprising:
receiving the communication from the first user via particular communication type; and
sending the message to the first user via the particular communication type.

19. The method of claim 15, wherein receiving the communication relating to the task comprises receiving the communication from a second user.

20. The method of claim 15, further comprising assigning the second priority level relative to the first priority level and assigning the third priority level relative to the second priority level.

* * * * *